Patented Jan. 27, 1925.

1,524,470

UNITED STATES PATENT OFFICE.

ALBERT BEIELSTEIN, OF BITTERFELD, GERMANY, ASSIGNOR TO THE FIRM CHEMISCHE FABRIK GRIESHEIM-ELEKTRON, OF FRANKFORT-ON-THE-MAIN, GERMANY.

PROCESS FOR RECOVERING LIGHT METALS FROM SCRAP.

No Drawing.    Application filed August 24, 1921.    Serial No. 494,842.

*To all whom it may concern:*

Be it known that ALBERT BEIELSTEIN, a citizen of the German Republic, residing at Deutsche Grube, Bitterfeld, Germany, has invented certain new and useful Improvements in Processes for Recovering Light Metals from Scrap, (for which I filed application in Germany March 13, 1920), of which the following is a specification.

This invention relates to a process for recovering light metals from scrap produced in the working of metals in foundry work and the like.

In the industrial working of light metals such as aluminium and its alloys, magnesium and its alloys, scrap is produced in the form of sheet cuttings, scrap wire and the débris from boring and milling. In casting light metals in moulding sand or metal moulds, gates and risers are formed, which in some circumstances may constitute a considerable proportion of the amount of metal used. Other manufacturing processes also furnish various forms of scrap. The money value of the metal contained in such scrap makes it necessary to devise a process for the completest possible recovery of metal.

Processes are already known which are intended to serve this purpose, however,—especially in the case of magnesium and magnesium compounds,—they fail to meet all the requirements necessary from a technical and economic point of view. The operation of remelting to uniform large metal masses, must also be combined with an extensive elimination of more or less accidental impurities, such as moulding sand, fragments of iron and other foreign metals, oil or other contaminating materials.

The hitherto known methods for the purification of light metals, especially of magnesium employ the so-called process of remelting under a salt cover, as described for instance by Sonstadt, British Patent 3021/1862, and Chemical News 1863, for agglomerating by fusion of globules of magnesium obtained by the reduction by sodium under a layer of magnesium chloride, or as described in a more lucid manner by Borchers (Electrometallurgie 3rd edition page 18 second paragraph) for purifying magnesium by fusion under a layer of carnallite. A known and repeatedly described disadvantage in this use of chlorides as fluxing agents however, is that small amounts of the chlorides are always retained in the apparently homogeneous metal regulus, and these, under the influence of the moisture of the air, afterwards give rise to unsightly efflorescence, and to the formation of pittings in the finished worked metal (castings, sheets and the like).

In order to avoid efflorescence of magnesia in the purification of magnesium and magnesium alloys it has been proposed in British Patent No. 23439/09 to melt the magnesium or magnesium alloys with potassium or sodium chloride, or a mixture thereof, which chlorides have melting points much above that of the metal, or alloy, and thereupon to cool the mass below the solidification temperature of the chloride, to separate this fluid from the solid crust of chlorides, and to separate any remaining traces of chloride from the metal by keeping same fluid for some time, under the exclusion of the air, at a temperature below the solidification point of chloride. However, I have found when using this process on a large scale that it was not possible to attain the desired removal of chlorides.

The application of these known processes thus require the purified metal to be submitted to a further special treatment for the purpose of removing the residual chlorides. The precaution sometimes used in metallurgy of adapting the amount of additions exactly to that of the impurities present, must be regarded ab initio as useless in the present case in view of the kind of the impurities contained in the residues and scrap. It would necessitate an exact analysis of all the impurities, for example, the amount of nitrides, oxides, silicides, carbon and the like present, and required reagents adapted to remove each of these impurities would have to be selected.

I have now observed that when magnesium scrap for example, is stirred with small amounts of magnesium chloride (approximately corresponding to the amount of impurities present) at an elevated temperature, the magnesium chloride together with the foreign substances present, forms semi-solid and solid aggregations which in turn, when the molten mass is further stirred, take up and retain certain quantities of the pure liquid magnesium chloride still present therein.

By this means even with comparatively very small quantities of magnesium chloride, it has been found possible, beyond all expectation, to remove the whole of the impurities from the metal melt. Apart from foreign oxides and other compounds, such as nitrides, phosphides and silicides, other foreign bodies such as carbon (which for instance is produced by the decomposition of the hydrocarbons when greasy turnings are melted), sand and graphite (from mould castings) and the like are eliminated through the agglomerating properties of small quantities of magnesium chloride, whilst simultaneously the free magnesium chloride still remaining in the melt is completely taken up by the resulting agglomerant masses during subsequent stirring. Whilst up to the present the metal to be remelted has been so to speak so overloaded with magnesium chloride and the final traces of magnesium chloride remaining in the metal have had to be removed by a special after-treatment, the characteristic feature of the present invention consists in that the metal is mixed with only sufficient fused magnesium chloride to ensure the agglomeration of the foreign bodies and the absorption of the excess of magnesium chloride.

Numerous experiments have furthermore shown that these conditions are almost always fulfilled if the magnesium chloride added corresponds approximately to the quantity of the impurities present. In certain abnormal cases the impurities may be brought to the desired condition by grading, that is to say, mixing together different parcels of scrap metal containing known quantities of various admixtures or impurities.

The process is suitable not only for the treatment of magnesium and magnesium alloys but also for the recovery of aluminium and other light metals and their alloys.

The process is preferably carried out in a crucible provided with a stirrer having a plurality of arms. The scrap is introduced into the crucible and from time to time small quantities of magnesium chloride are added. The mass is melted at a low temperature and finally the last quantity of magnesium chloride is added to the molten mass. The stirrer can be kept at work from the beginning. The stirring is then continued at an increased temperature at least until the molten salt has completely disappeared from the surface of the metal. In this operation the impurities absorb the molten salt like a sponge, and masses are produced which become stiffer and stiffer and which, as stirring proceeds, agglomerate to nodules and lumps. After stopping the stirrer and allowing the mass to settle the metal can be poured off from the residual separated mass which has sunk to the bottom. Instead of using pure anhydrous magnesium chloride, anhydrous carnallite may be used, provided the occlusion of traces of potassium in the metal is not detrimental to the use for which the metal is intended. Mixtures of carnallite and magnesium chloride may also be used.

Finally it may be mentioned that when a perfectly satisfactory magnesium chloride is not available use may be made of magnesium chloride produced in the salt itself by introducing the required amount of dry chlorine gas, which is very energetically absorbed by the heated or molten magnesium.

*Example 1.*

Magnesium foundry scrap contaminated by oxide and sand is purified by using for example 750 kilos molten metal to 20 kilogrammes anhydrous magnesium chloride and stirring the metal bath for a short time energetically at a temperature exceeding 800° C. On afterwards lowering the temperature of the melt to near the melting point, stirring is continued, whereupon the mass is left to settle and the metal is poured off from the residue at the bottom.

*Example 2.*

Impure turning of a magnesium alloy consisting of zinciferous magnesium contaminated with about 7% of impurities of grease and shop waste, are fused with gradual addition of 40 kilos anhydrous magnesium chloride to 600 kilos of metal. During continued energetic stirring the temperature of the bath is increased to above 800° C., at which temperature it is kept for about half-an-hour. At this stage the impurities take up the molten anhydrous magnesium chloride and transform it into solid adsorption compounds which sink, as such, to the bottom of the crucible. The metal is thereupon raised to suitable pouring temperature and is poured off freed from the impurities.

*Example 3.*

1000 kilos aluminium scrap containing 5% of non-metallic admixtures are melted with 60–80 kilos anhydrous magnesium chloride. After stirring for half-an-hour, the molten metal is cooled down to pouring temperature and is then poured off from the deposited residue containing the impurities. The yield of metal amounts to 96–98% of the metal originally present.

What I claim and desire to secure by Letters Patent is:—

1. The process for recovering light metals such as magnesium and aluminium from scrap, which comprises melting the scrap metal at an elevated temperature, mixing it with only sufficient fused magnesium chloride to ensure the agglomeration of the foreign bodies and the absorption of any excess of magnesium chloride, stirring the molten mass until the foreign substances have taken up all the magnesium chloride, thereupon causing this mass to settle, and separating the metal melt from the foreign substances.

2. The process for recovering light metal alloys such as alloys of magnesium and aluminium from scrap, which comprises melting the scrap metal at an elevated temperature, mixing it with only sufficient fused magnesium chloride to ensure the agglomeration of the foreign bodies and the absorption of any excess of magnesium chloride, stirring the molten mass until the foreign substances have taken up all the magnesium chloride, thereupon causing this mass to settle, and separating the metal melt from the foreign substances.

3. The process for recovering from scrap light metal alloys such as alloys of magnesium containing limited amounts of foreign metals which comprises melting the scrap metal at an elevated temperature, mixing it with only sufficient fused magnesium chloride to ensure the agglomeration of the foreign bodies and the absorption of any excess of magnesium chloride, stirring the molten mass until the foreign substances have taken up all the magnesium chloride, thereupon causing this mass to settle, and separating the metal melt from the foreign substances.

4. The process for recovering light metals such as magnesium and aluminium from scrap, which comprises melting the scrap metal at an elevated temperature with small amounts of anhydrous magnesium chloride, stirring the molten mass until the foreign substances have taken up all the magnesium chloride still present in the melt, thereupon causing this mass to settle, and removing the metal melt freed from foreign substances and from magnesium chloride.

5. The process for recovering light metals alloys such as alloys of magnesium and aluminium from scrap, which comprises melting the scrap metal at an elevated temperature with small amounts of anhydrous magnesium chloride, stirring the molten mass until the foreign substances have taken up all the magnesium chloride still present in the melt, thereupon causing this mass to settle and removing the metal melt freed from foreign substances and from magnesium chloride.

6. The process for recovering from scrap light metal alloys such as alloys of magnesium and aluminium containing limited amounts of foreign metals, which comprises melting the scrap metal at an elevated temperature with small amounts of anhydrous magnesium chloride, stirring the molten mass until the foreign substances have taken up all the magnesium chloride still present in the melt, thereupon causing this mass to be deposited, and removing the metal melt free from foreign substances and from magnesium chloride.

7. The process for recovering light metals such as magnesium and aluminium from scrap, which comprises melting the scrap metal at an elevated temperature, mixing it with only sufficient fused carnallite to ensure the agglomeration of the foreign bodies and the absorption of any excess of carnellite stirring the molten mass until the foreign substances have taken up all the carnallite, thereupon causing this mass to settle, and separating the metal melt from the foreign substances.

8. The process for recovering light metals such as magnesium and aluminium from scrap, which comprises melting the scrap metal at an elevated temperature with small amounts of anhydrous carnallite, stirring the molten mass until the foreign substances have taken up all the carnallite still present in the melt, thereupon causing this mass to settle, and removing the metal melt freed from foreign substances and from carnallite.

9. The process for recovering light metals such as magnesium and aluminium from scrap, which comprises melting the scrap at an elevated temperature, mixing it with only sufficient of a fused mixture of magnesium chloride and carnallite to ensure agglomeration of the foreign bodies and the absorption of any excess of magnesium chloride and carnallite, stirring the molten mass until the foreign substances have taken up all the magnesium chloride and carnallite, thereupon causing this mass to settle, and separating the metal melt from the foreign substances.

10. The process for recovering light metals such as magnesium and aluminium from scrap, which comprises melting the scrap metal at an elevated temperature with small amounts of a mixture of anhydrous magnesium chloride and anhydrous carnallite, stirring the molten mass until the foreign substances have taken up all the magnesium chloride and carnallite still present in the melt, thereupon causing this mass to settle, and removing the metal melt freed from foreign substances and from magnesium chloride and carnallite.

11. The process for recovering light metals containing magnesium from scrap which comprises melting the scrap at an elevated temperature, introducing the required amount of dry chlorine gas into said melt to form only sufficient magnesium chloride to ensure the agglomeration of the foreign bodies and the absorption of any excess of magnesium chloride, stirring the molten mass until the foreign substances have taken up all the magnesium chloride, thereupon causing this mass to settle, and separating the metal melt from the foreign substances.

12. The process for recovering light metals containing magnesium from scrap, which comprises melting the scrap at an elevated temperature, introducing the required amount of dry chlorine gas into said melt to form small amounts of magnesium chloride, stirring the molten mass until the foreign substances have taken up all the magnesium chloride still present in the melt, thereupon causing this mass to settle and removing the metal melt freed from foreign substances and from magnesium chloride.

13. The process for recovering light metal alloys containing magnesium from scrap which comprises melting the scrap at an elevated temperature, introducing the required amount of dry chlorine gas into said melt to form only sufficient magnesium chloride to ensure the agglomeration of the foreign bodies and the absorption of any excess of magnesium chloride, stirring the molten mass until the foreign substances have taken up all the magnesium chloride, thereupon causing this mass to settle, and separating the metal melt from the foreign substances.

14. The process for recovering light metal alloys containing magnesium from scrap, which comprises melting the scrap at an elevated temperature, introducing the required amount of dry chlorine gas into said melt to form small amounts of magnesium chloride, stirring the molten mass until the foreign substances have taken up all the magnesium chloride still present in the melt, thereupon causing this mass to settle and removing the metal melt freed from foreign substances and from magnesium chloride.

15. The process for recovering magnesium from foundry scrap contaminated by oxide and sand, which comprises melting the scrap with anhydrous magnesium chloride, stirring the metal for a short time energetically at a temperature exceeding 800° C., to ensure the agglomeration of the foreign bodies and the absorption of any excess of magnesium chloride, thereafter lowering the temperature of the melt to near the melting point, whilst stirring is continued, thereupon causing the mass to settle, and pouring off the molten metal from the residues at the bottom.

16. The process for recovering magnesium from impure turning of a magnesium alloy, consisting of zinciferous magnesium contaminated with impurities of grease and shope waste, which comprises melting the scrap and adding gradually anhydrous magnesium chloride, stirring energetically and raising the temperature to above 800° C., to ensure the agglomeration of the foreign bodies and the absorption of any excess of magnesium chloride, keeping the melt at that temperature for about half-an-hour, allowing the metal to settle into solid adsorption compounds causing said compounds to settle, thereupon raising the temperature to suitable pouring temperature, and pouring off the metal freed from impurities.

In testimony whereof I affix my signature.

ALBERT BEIELSTEIN.